Oct. 15, 1935.   H. D. BONNELL   2,017,116
AGITATING APPARATUS
Filed April 2, 1932   2 Sheets-Sheet 1
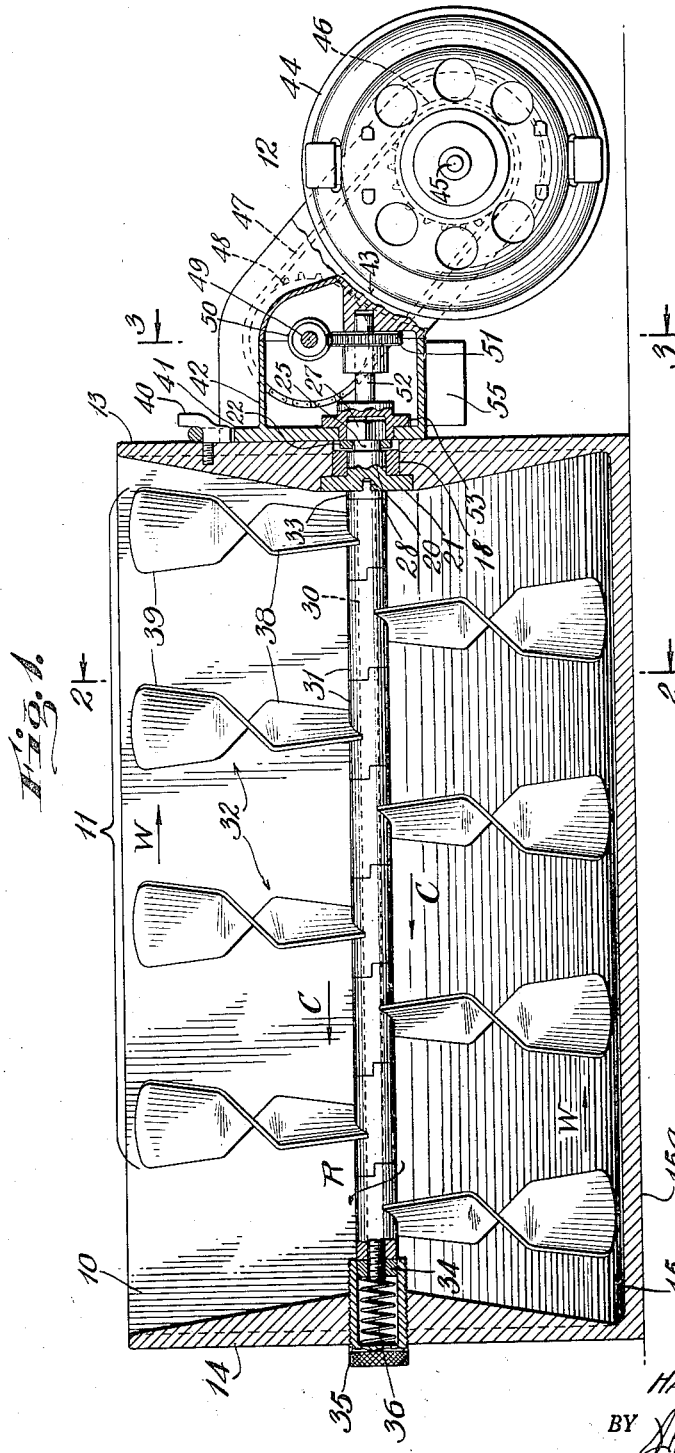
INVENTOR.
HAROLD D. BONNELL
BY
ATTORNEY Oct. 15, 1935.　　　H. D. BONNELL　　　2,017,116
AGITATING APPARATUS
Filed April 2, 1932　　　2 Sheets-Sheet 2
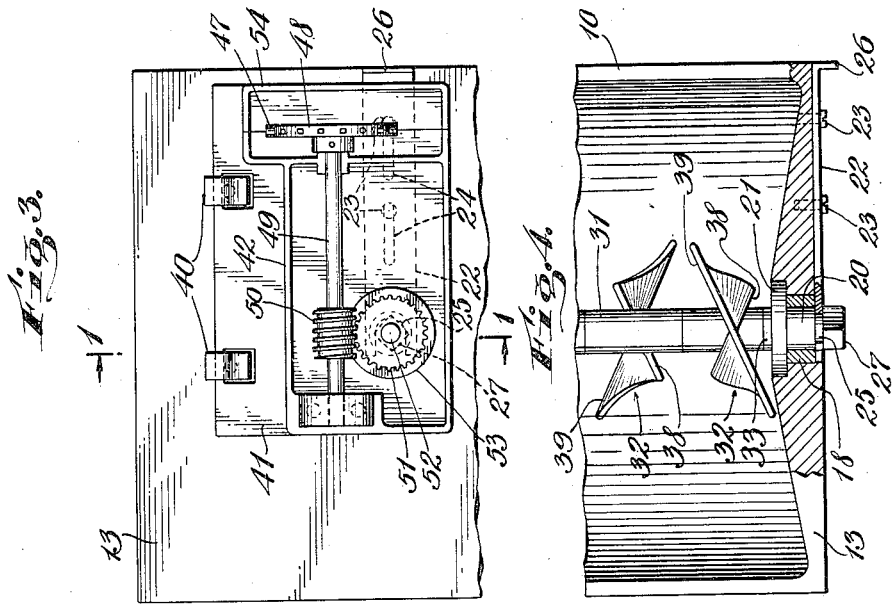
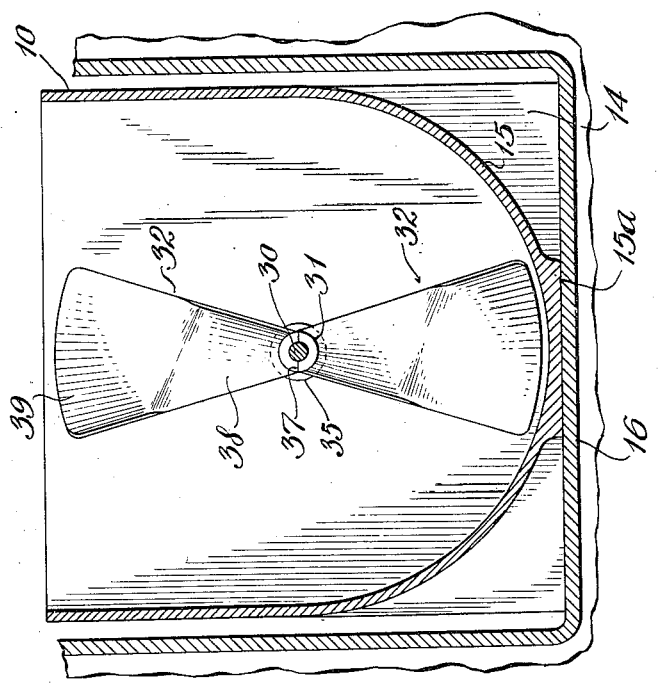
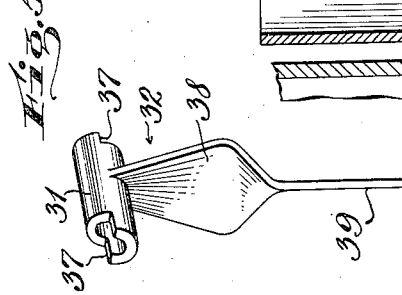
INVENTOR.
HAROLD D. BONNELL
BY
ATTORNEY Patented Oct. 15, 1935

2,017,116

UNITED STATES PATENT OFFICE 2,017,116

AGITATING APPARATUS

Harold D. Bonnell, Plainfield, N. J.

Application April 2, 1932, Serial No. 602,704

7 Claims. (Cl. 259—110)

The present invention relates to apparatus for agitating, churning, mixing or circulating fluids and/or comminuted solids.

An object of the invention is to provide an agitating apparatus which can be readily dismantled for cleansing and be as readily reassembled.

Another object of the invention is to provide a rotary agitator which while turning continuously in one direction will not only impart rotational motion to the matter being agitated but will simultaneously impel part of said matter in one axial direction and another part in the opposite direction.

Another object of my invention is to provide an agitating apparatus adapted to facilitate the introduction of heat into or abstraction of heat from the matter that is being agitated.

To take care of matter that tends to coagulate, thicken or become more dense during the agitating process, my invention provides means for automatically disconnecting the agitator from power when the load on the agitator rises to a predetermined value. Thus my invention is particularly adapted for freezing ice cream, wherein the agitator will be automatically arrested when the cream has thickened sufficiently.

A specific object of my invention is to provide an ice cream freezer adapted to be placed in the refrigerating element of a mechanical refrigerator, particularly of the household type. Hitherto one of the drawbacks of such refrigerators has been the fact that only a limited variety of frozen desserts could be made therein, because no means has been available for stirring the food mixture while in the refrigerator. My invention in one of its embodiments provides an ice cream freezer with a power driven agitator of such form that it may be fitted together with its power unit into the refrigerating element of a household mechanical refrigerator.

Another object of the invention is to provide a refrigerator of this type with a power unit which may be readily detached from the ice cream freezer, so that the power unit will not be damaged when the freezer is washed and sterilized.

Other objects and advantages of my invention will appear in the following description of a preferred embodiment and thereafter the novelty and scope of the invention will be pointed out in the claims.

In the accompanying drawings;

Figure 1 is a view in longitudinal section of an ice cream freezer adapted for use in the refrigerating unit of a mechanical refrigerator, the section being taken substantially on the irregular line 1—1 of Fig. 3;

Fig. 2 is a view in transverse section taken on the line 2—2 of Fig. 1;

Fig. 3 is a view in transverse section taken on the line 3—3 of Fig. 1;

Fig. 4 is a plan view partly broken away, and in section, of the forward end of the freezer; and Fig. 5 is a view in perspective of one of the agitator units employed in the freezer.

The ice cream freezer illustrated in the drawings comprises in general a container 10 for the ice cream, an agitator 11 mounted to rotate in the container and readily removable therefrom, and a motor unit 12 for driving the agitator, said unit being readily detachable from the container.

The container is preferably a casting comprising rectangular front and rear end walls 13 and 14 respectively whose horizontal lower edges are adapted to rest on a suitable support. Connecting the end walls is a semi-cylindrical bottom wall 15 which merges into a pair of vertical side walls. The inner surface of the bottom wall is coaxial with the agitator. Exteriorly the bottom wall is formed with a pad 15a which extends from end to end of the container and lies flush with the lower edges of the end walls. The purpose of this pad is to provide a large area of contact with the floor of a refrigerating element 16, as indicated in Fig. 2. Obviously, if the apparatus is to be used for agitating a mixture that is to be heated the pad 15a will provide a large area for contact with a stove or heating element.

In the end wall 13 is a stepped opening in which is fixed a bushing 18. The latter serves as a bearing for a stub shaft 20 formed with a flange 21 which lies within the opening and bears against the inner end of the bushing. Slidable in a recess formed in the outer face of the front wall 13 is a plate 22 which is retained in the recess by screws 23 that pass through slots 24 in the plate and are threaded into the wall 13. At its inner end the plate is forked to engage an annular groove 25 formed in the stub shaft and thus retain the shaft in its bearing. The outer end of the plate 22 is bent at right angles to provide a finger hold 26 by which the plate may be slid clear of the stub shaft when it is desired to remove said shaft from the container. The outer end 27 of the stub shaft is preferably squared so that it may be coupled to a drive shaft of the motor unit as will be explained hereinafter.

The inner end face of the stub shaft is formed with a transverse groove to receive a tongue 28 projecting from the end of an agitator shaft 30.

On this shaft is assembled a series of agitator units. In other words, the shaft passes through the hubs 31 of a series of agitator vanes 32 and said hubs are clamped between a flange 33 at the forward end of the shaft and a nut 34 screwed upon the rear end of the shaft. This nut has a cylindrical outer surface and is fitted to slide in a socket member or thimble 35 screwed into the rear end wall 14. A compression spring 36 in the thimble bears against the nut 34 and forms a yielding thrust bearing which makes it possible to remove the agitator from the container by sliding it rearwardly until the tongue 28 slips out of the groove in the stub shaft. In the meantime, the stub shaft is held by the fork plate 22 from sliding out of its bearing with the agitator. The spring 36 may be secured to the thimble by a drop of solder or in any other suitable manner, to prevent it from dropping out and being lost when the apparatus is dismantled for cleaning or any other purpose. The thimble 35 projects from the rear face of the wall 14 and the projecting part may be knurled or formed with a slot for a screw driver whereby the thimble may be adjusted from without the container to vary the compression of the spring 36.

As stated above, the agitator is composed of an assembly of vane units which are all alike and hence interchangeable excepting for the units at each end of the assembly. These end units differ from the intermediate units only in a slight modification of their hubs. The hubs of the intermediate units are stepped at each end, as clearly indicated at 37—37 in Fig. 5, but the hubs of the end units are stepped only at their inner ends and are provided with flat outer end faces to bear against the flange 33 and nut 34 respectively. It will be observed that the step 37 at one end of each hub of the intermediate units is complementary to the step at the other end. Thus, as shown in Fig. 5, the step at the right hand end of the hub is formed by cutting away a portion of the lower half of the hub, while the opposite step is formed by cutting away a complementary portion of the upper half of the hub.

Each agitator unit has a single blade or vane 32 and in assembling the vanes they are arranged so that alternate vanes are disposed at an angle of 180 degrees to the intermediate vanes, and so that each step 37 fits upon the opposed step 37 of the next adjacent hub. Each vane is twisted intermediate its length so that there is an inner impelling surface 38 which is angled oppositely to the outer impelling surface 39. I have found that excellent results are obtained with each vane portion disposed at an angle of 30 degrees to its orbital plane, the impelling surface 38 being disposed at an angle of 60 degrees to the surface 39. However, these angles may be varied at will to suit different conditions. When the vane is rotated about its axis the inner impelling surface 38 will produce a feed of material in one axial direction and the outer portion a feed in the opposite direction. At the same time, there will be a rotary feed caused by the rotation of the vane. The advantages of this arrangement will be brought out more fully hereinafter.

The vanes are flared to a greater width at their outer ends and the inner faces of the end walls 13 and 14 are made conical to conform substantially to such flare and prevent the formation of stagnant end zones in the container.

The motor unit 12 is suspended on the front end wall 13 of the container, and for this purpose a pair of hooks 40 are provided on the end wall near the upper edge thereof which are adapted to enter slots formed in a base plate 41 of a bracket 42. The latter is formed with a seat 43 to which the shell of the motor 44 may be secured by screws or in any other manner. The armature shaft 45 of the motor bears a sprocket wheel 46 which is connected by a chain 47 to a sprocket wheel 48 secured to a jack shaft 49 journalled in the bracket 42. A worm 50 secured to the shaft 49 meshes with a worm wheel 51 secured upon a drive shaft 52. This drive shaft has a socket member 53 fixed thereon which projects through a bearing in the base plate 41. The member 53 is formed with a rectangular socket adapted to receive the squared end 27 of the stub shaft 20 when the parts are in the position shown in Fig. 1, so that the shaft 30 of the agitator assembly will be driven at reduced speed by the motor.

It will be observed, that the motor unit is hinged upon the hooks 40 and the weight of the motor 44 exerts a powerful leverage tending to hold the base plate 41 against the wall 13 and the socket member 53 in engagement with the squared end 27 of the stub shaft 20. Obviously, the shaft end 27 and the socket in the member 53 may be of any other form which would insure an operative coupling of the two members. If, when the motor unit is applied to the container the shaft end 27 happens to be out of register with the socket said unit will merely be tilted outwardly resting on the shaft end. But after the motor has been started the member 53 will turn until the socket is in register with the shaft end and the motor unit will then drop to normal position and the coupling of the shafts 20 and 52 will thus be effected automatically. The reducing gear between the motor 44 and the drive shaft 52 is preferably encased and to this end I provide a gear case 54 to cover the sprocket belt and gears and the bracket 42 is shaped to cover the worm gearing.

In operation, assuming that the parts are assembled as shown in Fig. 1, the container 10 is filled with cream, custard or other food that is to be frozen. The motor is then energized by turning a starting switch, not shown, and through the reduction gearing the agitator will be rotated comparatively slowly in the direction indicated by the arrow "R". The cream in the container will then be impelled in the direction of the arrows "C" by the inner parts 38 of the agitator vanes, while the outer part 39 of the vanes will impel the cream in the direction of the arrows "W". At the same time, the vanes will all impart a rotary motion to the contents of the container in the direction of the arrow "R". It will be noted that this three-directional drive is effected with a single shaft and a set of vanes fixed thereon. The result of this drive is to produce a spiral inner feed of the cream toward the rear of the container and a spiral outer feed toward the front of the container. The rear end of the refrigerating element of the ordinary mechanical refrigerator is colder than the forward end and hence the agitator draws the cooler cream forwardly in a substantially cylindrical stream and returns the relatively warmer cream in the form of a core rearwardly to the cooler end of refrigerating unit.

When the cream thickens, it is desirable to stop the rotation of the agitator and this is effected automatically by reason of the spring thrust bearing at the rear of the shaft 30. Since the outer portions of the vanes have a greater surface area than the inner portions, as clearly shown in Fig. 2, a higher resistance is presented by the cream to these outer portions than to the inner portions. Hence, there is a preponderance of thrust on the agitator toward the rear of the container which is normally resisted by the spring. But when the cream thickens to a predetermined degree the spring yields to the increased thrust permitting the tongue 28 to slip out of engagement with the stub shaft. This will interrupt the rotation of the agitator and the cream will then be permitted to set.

I have also provided another way in which the rotation of the agitators may be interrupted. The motor circuit is provided with an overload switch which is indicated at 55. By screwing up the thimble 35 the spring 36 may be adjusted so that it will not yield before the thickening cream has built up a load heavy enough to operate the overload switch. The overload switch may be set to automatically disconnect the motor from power when the cream has thickened sufficiently, so that the agitator will come to rest. The spring thrust bearing may be relied upon to take care of overload conditions should the switch 55 fail to function. The yieldable thrust bearing is also needed to facilitate dismantling the apparatus.

The apparatus may readily be kept sanitary. The motor unit is easily detachable so as to prevent it from getting wet while cleaning the container and the agitator. To clean the parts the agitator is removed as described above by depressing the spring 36 and withdrawing the shaft 30 with the vanes thereon. If desired, the nut 34 may be unscrewed and the vanes dismantled for individual cleansing. However, this is seldom necessary because the step joints between the hubs fit so closely as to provide virtually a one piece hollow shaft. In fact, the agitator could be made in a single piece, although I prefer to build it up of separate units which may be readily formed by the die casting process. The thimble 35 may be removed by unscrewing it from the wall 14 and the stub shaft 20 may be removed from its bearing by sliding out the forked plate 22, and the parts may then all be thoroughly cleansed and reassembled.

As stated above, while my invention is excellently adapted for the freezing of ice cream in mechanical refrigerators it is not limited to this purpose. The novel agitator by which three-directional drive is obtained with a set of vanes fixed upon a single shaft is capable of application to a great many other purposes. It will be understood, therefore, that the embodiment described above is to be taken as illustrative and not limitative of my invention and that I reserve the right to apply the invention to other arts and also to make various changes in form, construction and arrangement of parts without departing from the spirit and scope of the following claims.

I claim:

1. An article of manufacture, a rotary agitator unit comprising a hub formed with stepped ends, there being a single step at each end and the step at one end being complementary to that at the other, a vane projecting radially from the hub, said vane being twisted intermediate its length to provide a pair of angled impelling surfaces, the angle of one of said surfaces being opposed to the angle of the other.

2. A freezer for use in a refrigerating element of a mechanical refrigerator, said freezer comprising a container adapted to be inserted in said element, an agitator rotatable in the container, a driving unit, a coupling normally operatively connecting the agitator and said unit, said coupling having coacting faces substantially parallel to its axis of rotation, the agitator being adapted to exert axial thrust on said matter, and a resilient thrust bearing for the agitator permitting axial movement of the agitator to disconnect said coupling when the load exerted on the agitator by said matter exceeds a predetermined value.

3. A freezer for use in a refrigerating element of a mechanical refrigerator, said freezer comprising a container adapted to be inserted in said element, an agitator mounted to rotate in the container and having limited axial movement therein, a drive shaft for rotating the agitator, a coupling normally connecting the drive shaft and the agitator, said coupling having coacting faces substantially parallel to its axis of rotation and being disengageable by axial movement of the agitator, the agitator being adapted to exert axial thrust on said matter, a spring opposing axial movement of the shaft and thereby controlling the axial thrust on said matter, and means for adjusting the power of said spring.

4. A freezer for use in a refrigerating element of a mechanical refrigerator, said freezer comprising a container adapted to be inserted in said element, an agitator mounted to rotate therein and formed with vanes adapted to produce a thrust in axial direction of the agitator, and power means having driving engagement with the agitator, the latter being movable by said thrust out of engagement with the power means when the thrust exceeds a predetermined limit, said driving engagement comprising a coupling having coacting faces substantially parallel to the axis of rotation of the coupling.

5. A freezer for use in a refrigerating element of a mechanical refrigerator, said freezer comprising a container adapted to be inserted in said element, a motor, an agitator rotatable in the container, the motor having driving engagement with the agitator, a mounting for the agitator permitting the latter to move axially out of engagement with the motor, said agitator including vanes tending to move the agitator to disengaging position, and a spring opposing such movement of the agitator, said driving engagement comprising a coupling having coacting faces substantially parallel to the axis of rotation of the coupling.

6. A freezer for use in a refrigerating element of a mechanical refrigerator, said freezer comprising a container adapted to be inserted in said element, a shaft mounted to rotate and move axially therein, a motor, a clutch between the shaft and the motor adapted to be disengaged by axial movement of the shaft away from the motor, vanes carried by the shaft and providing (with respect to radius) an inner set and an outer set of impelling surfaces disposed angularly with respect to their orbital planes, one set being oppositely angled with respect to the other and the axial thrust of one set being greater than that of the other and tending to cause disengagement of the clutch, and a spring resisting disengagement of the clutch.

7. An agitator comprising a rotatable shaft, a series of interchangeable agitator units mounted thereon, each unit comprising a hub and a vane projecting radially therefrom, each hub being formed with a single step at each end thereof, the step at one end being complementary to that at the other so that adjacent hubs are interlocked with the vanes sequentially disposed at an angle of 180 degrees to one another, and means for clamping the hubs upon the shaft, each vane comprising an impelling surface adjacent the hub and disposed at an angle to its plane of rotation and another impelling surface remote from the hub disposed at an equal but opposite angle to said plane.

HAROLD D. BONNELL.